(12) United States Patent
Panico et al.

(10) Patent No.: US 7,091,495 B2
(45) Date of Patent: Aug. 15, 2006

(54) SYSTEMS AND METHODS FOR TREATING LIQUIDS

(75) Inventors: Louis R. Panico, Danvers, MA (US); C. Richard Panico, Medford, MA (US)

(73) Assignee: Xenon Corporation, Woburn, MA (US)

( * ) Notice: Subject to any disclaimer, the term of this patent is extended or adjusted under 35 U.S.C. 154(b) by 0 days.

(21) Appl. No.: 10/987,172

(22) Filed: Nov. 12, 2004

(65) Prior Publication Data

US 2005/0189497 A1   Sep. 1, 2005

Related U.S. Application Data

(60) Provisional application No. 60/519,463, filed on Nov. 12, 2003.

(51) Int. Cl.
*G01N 21/01* (2006.01)
*G01N 21/51* (2006.01)

(52) U.S. Cl. .................... 250/432 R; 250/438
(58) Field of Classification Search ............. 250/438, 250/432 R
See application file for complete search history.

(56) References Cited

U.S. PATENT DOCUMENTS 4,755,292 A * 7/1988 Merriam ............. 210/192
5,626,768 A * 5/1997 Ressler et al. ....... 210/748

* cited by examiner

*Primary Examiner*—Kiet T. Nguyen
*Assistant Examiner*—James J. Leybourne
(74) *Attorney, Agent, or Firm*—Wilmer Cutler Pickering Hale and Dorr LLP

(57) ABSTRACT

A liquid treatment system includes a housing and a lamp system formed from at least one wall, the lamp system in the housing together defining a flow path for liquid that passes between a housing wall and the wall with the lamp, and then between another side wall of the lamp housing and another wall of the housing.

17 Claims, 5 Drawing Sheets

SYSTEMS AND METHODS FOR TREATING LIQUIDS

CROSS-REFERENCE TO RELATED APPLICATION

This application claims priority to Provisional Application No. 60/519,463, filed Nov. 12, 2003, which is incorporated herein by reference.

BACKGROUND OF THE INVENTION

Ultraviolet (UV) light, continuous or pulsed, can be used to treat water, including to disinfect water and deactivate pathogens therein.

Known pulse light systems for various uses generally include a power supply, a capacitor bank charged by the power supply, a pulse configuration circuit for shaping the height and width of a pulse, and a pulse lamp, which can include xenon or mercury.

SUMMARY OF THE INVENTION

Systems and methods are described here for treating liquids. While the present application is described in the context of water treatment, it should be understood that other liquids can be treated in this manner.

Features of systems and methods described herein can include one or more of the following: creating a flow path of liquid in one or more paths, including rectangular cross-section paths; creating flow paths with variable depths; the ability to control the depth of a flow path, including for the purpose of providing a shallower path for more contaminated liquids; allowing the use of lower treatment energy to avoid damaging desirable components in the liquid, such as protein in water; the use of reflective surfaces; and/or the ability to have multiple treatment modules. The different depths in the flow path can make it easier to destroy contaminants, and/or to provide greater reliability. Other features and advantages will be come apparent from the following detailed description, drawings, and claims.

DETAILED DESCRIPTION

Figure 1A:
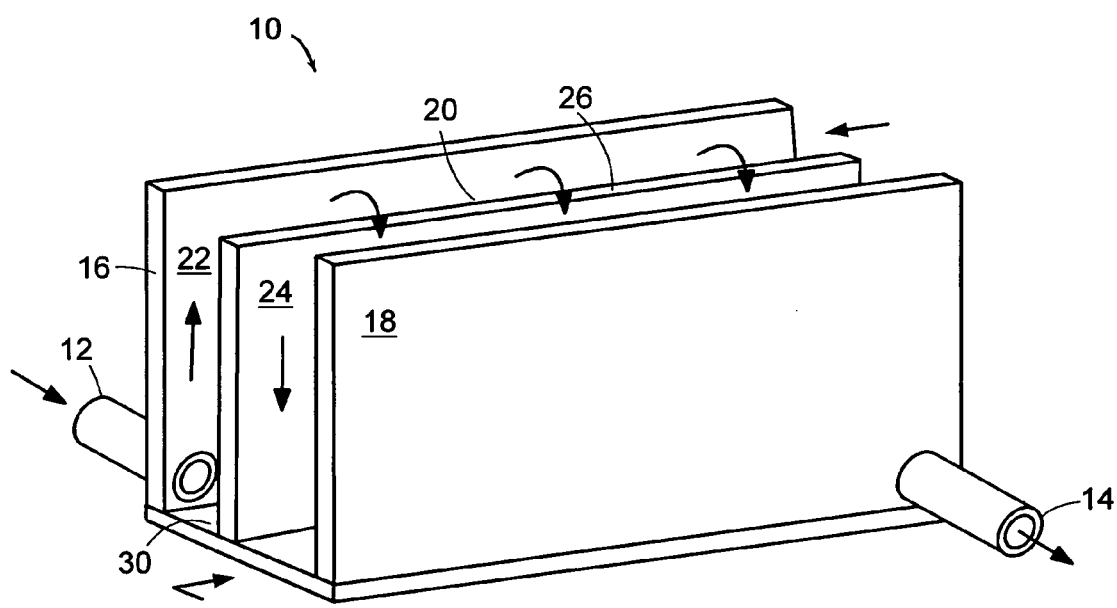
FIGS. 1A and 1B are a perspective view and side view, respectively, of a single module, adjustable flow system according to a first embodiment.
Figure 1B:
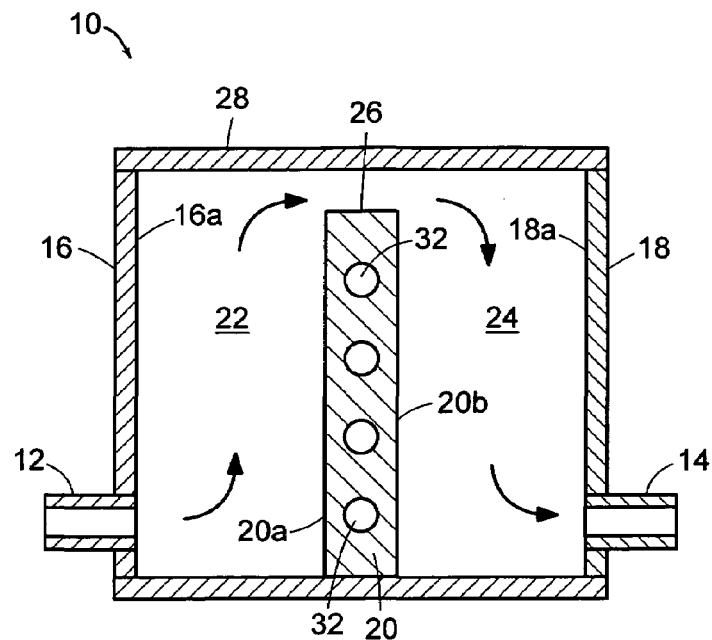

Referring to FIGS. 1A and 1B, a water treatment system 10 has an input 12 for receiving relatively untreated water, and an outlet 14 for providing treated water (or some other liquid). The water that is provided could have been treated previously by other means, such as with filtering or chemical treatments, or could be further treated after being provided from the outlet. System 10 has a rear wall 16 with input 12, a front wall 18 with outlet 14, side walls (not shown), and a top wall 28 (FIG. 1B). Between rear wall 16 and front wall 18 is a center wall 20, preferably vertical and parallel to both the front and rear walls. These walls define a first chamber 22 between wall 16 and wall 20, and a second chamber 24 between wall 20 and wall 18, both of which chambers are preferably but not necessarily rectangular in cross-section as the water flows.

Wall 20 has a height that is less than the height of walls 16 and 18, so that a gap is created between a top surface 26 of wall 20 and top wall 28 to provide a flow path from chamber 22 to chamber 24. As indicated in FIGS. 1A and 1B, the liquid has a flow path whereby it enters through input 12, passes upwardly through chamber 22, over top surface 26 of wall 20, and downwardly through chamber 24 before exiting at outlet conduit 14.

The inputs and outlets are shown here as cylindrical tubes, but the configurations could have other geometries, including funnel shapes or with multiple conduits, or could include a single conduit that fans out to provide water along a slot so that it is more evenly distributed along the width of chamber 22.

Wall 20 has UV-transparent sides 20a and 20b, and encloses one or more UV lamps 32. Lamps 32 can have one of several different configurations or combinations of configurations, including linear lamps, spiral lamps, or serpentine lamps (including U-shaped configurations). Inwardly facing surfaces 16a and 18a of walls 16 and 18, respectively, are preferably (but need not be) designed to reflect UV light so that light energy from lamps 32 passes through the water in chambers 22, 24 and is further reflected back to provide additional UV energy to the water for disinfection or decontamination.

One or more of walls 16, 18, and 20 can be movable relative to other walls to alter the depth of chambers 22 and/or 24 to control the depth (or "thickness") of the flow path. The depth of the flow path incorporates certain tradeoffs: a deeper chamber and flow path will allow more water to pass, but will allow less opportunity for energy from lamps 32 to treat the water, while a shallower flow path will provide more water treatment, but at a slower flow rate.

If the unit shown as system 10 is used in a modular manner with other units of the same or similar type, it may be desirable to have multiple units with different chamber sizes. Alternatively, there could be a number of units with smaller chambers and slower flow paths that feed into a single unit. For example, two different units each having a first flow rate could feed into second unit that has a flow rate that is twice that of each of the first units. In such a case, the initial treatment from the UV light would be more intense, followed by a less intense treatment of the water that has already been partially treated.

Within a single unit, wall 16, 18, and/or 20 can be made adjustable. In one implementation, wall 20 remains stationary with respect to floor 30. Walls 16 and 18 each have a sealing material, such as a gasket, that extends around the perimeter, thereby allowing the position of the wall to be adjusted within the unit (typically after the unit is cleaned out of any liquid) so that the unit can essentially be reassembled with a different chamber thickness. Markings can be provided on floor 30 to indicate different depths of the chamber to allow adjustment.

The adjustability feature could be provided such that the unit is field adjustable or could be made so that it is adjustable in the way that parts are initially created, but then are adjusted before the unit is provided to a customer using it for water treatment.

Lamps 32 can be either mercury or xenon lamps, and provide continuous or pulsed light. Because wall 20 that houses lamps 32 is covered on two sides by a liquid, the liquid can provide cooling for the lamp.

Figure 2:
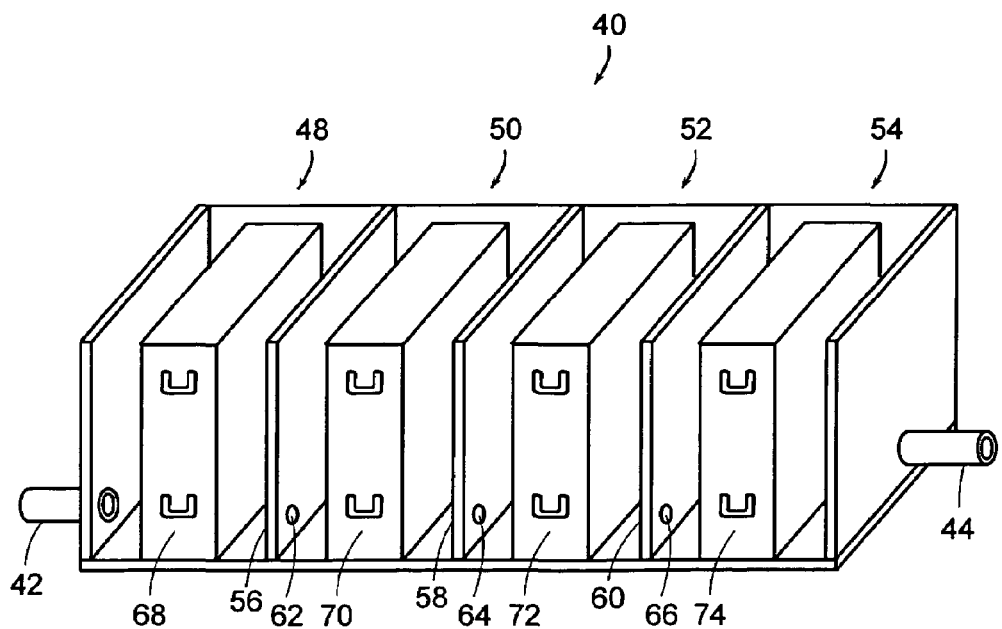
FIG. 2 is a perspective view of a multiple module adjustable pulse light sterilization system.

Referring to FIG. 2, in a second embodiment, a multi-module unit 40 has an inlet 42 and an outlet 44, both of which are shown as cylindrical conduits, but could have alternative configurations, with multiple modules of a type shown in FIG. 1A. As shown in FIG. 2, there are four chambers 48, 50, 52, and 54, separated by dividing walls 56, 58, and 60, each of which has a respective opening 62, 64, and 66 (or multiple openings) for allowing water to flow, respectively, from the first chamber to the second chamber, from the second chamber to the third chamber, and from the third chamber to the fourth chamber. Each chamber has two side walls, one of which may be shared with another chamber or may be an end wall of the entire unit, and also a partial wall 68, 70, 72, and 74, respectively. Each partial wall has a height that does not extend the full height of the unit, thereby allowing a gap so that water can flow up over wall 68–74. Each wall 68–74 houses one or more lamps, which, as indicated above, can be linear, spiral, serpentine, or some other desired configuration, can be a single lamp or a combination of multiple lamps, and can be continuous or provide light with pulses. The walls preferably are UV-transparent on two opposite sides to allow them to treat water as it passes one side of the wall and again as it passes another side of the wall.

Figure 3:
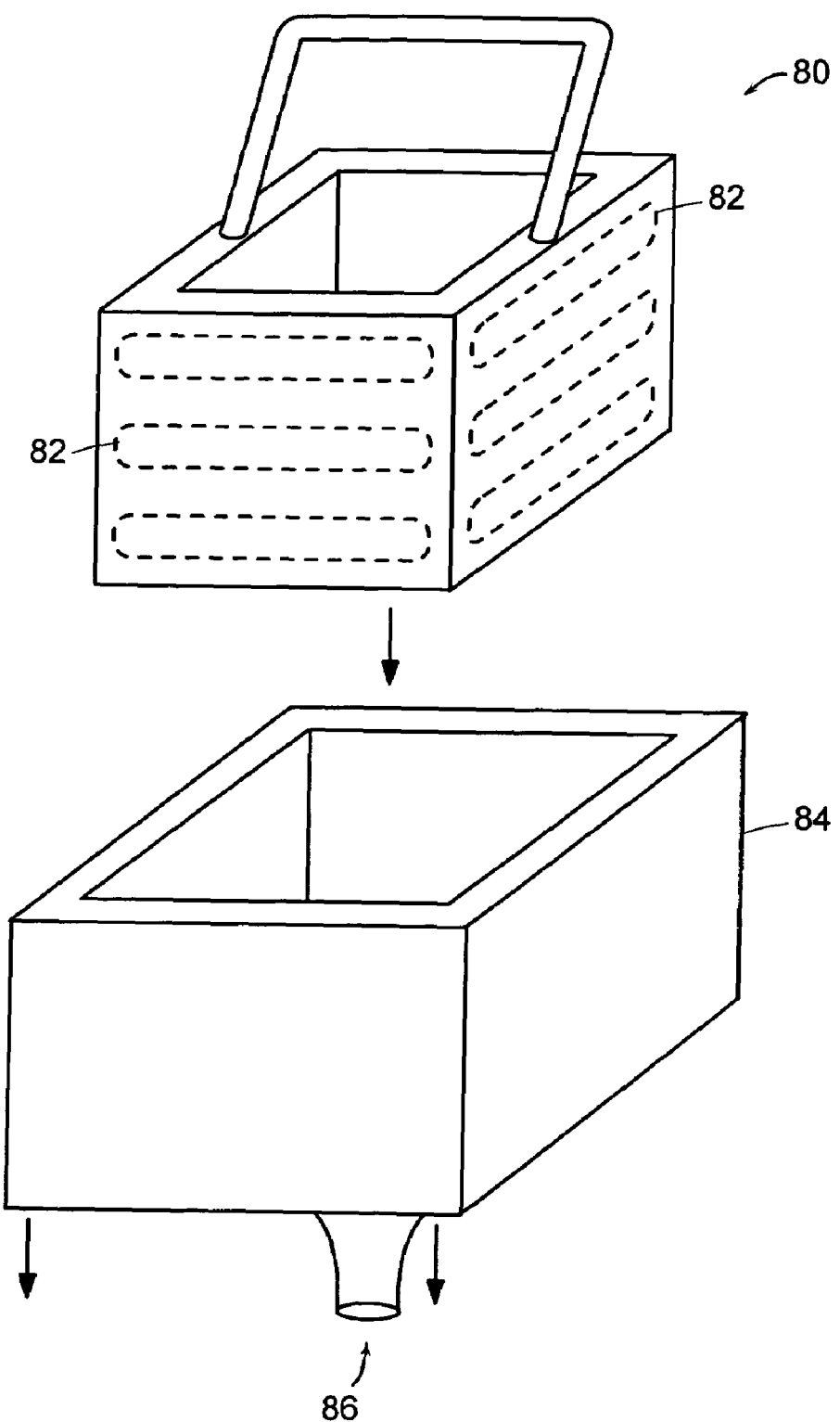
FIG. 3 is a perspective view of embodiment including a "lamp basket."

Referring to FIG. 3, in another embodiment, a device referred to here as a "lamp basket" 80 looks like a basket, except that the side walls of the basket each house lamps 82 suitable for providing energy to treat water and can have an open bottom. Lamp basket 80 can be removably inserted into an outer box 84 that has an inlet 86 for water flow to pass up through the interior of the basket, and then down a gap region that is outside basket 80 and inside outer box 84. Outer box 84 can have openings around the outside periphery of the box. The basket can be used in boxes of different sizes, or different sized baskets can be used with a single outer box, thereby providing the ability to control the depth of the flow path by changing the basket or the outer box. Like the previous embodiment the water can flow in one direction, over a wall, and back in an opposite direction, and can be treated on each side of the wall. As shown, the basket can have a rectangular cross-section when viewed from the top, but it could have different shapes, including any other polygon or circular.

Figure 4:
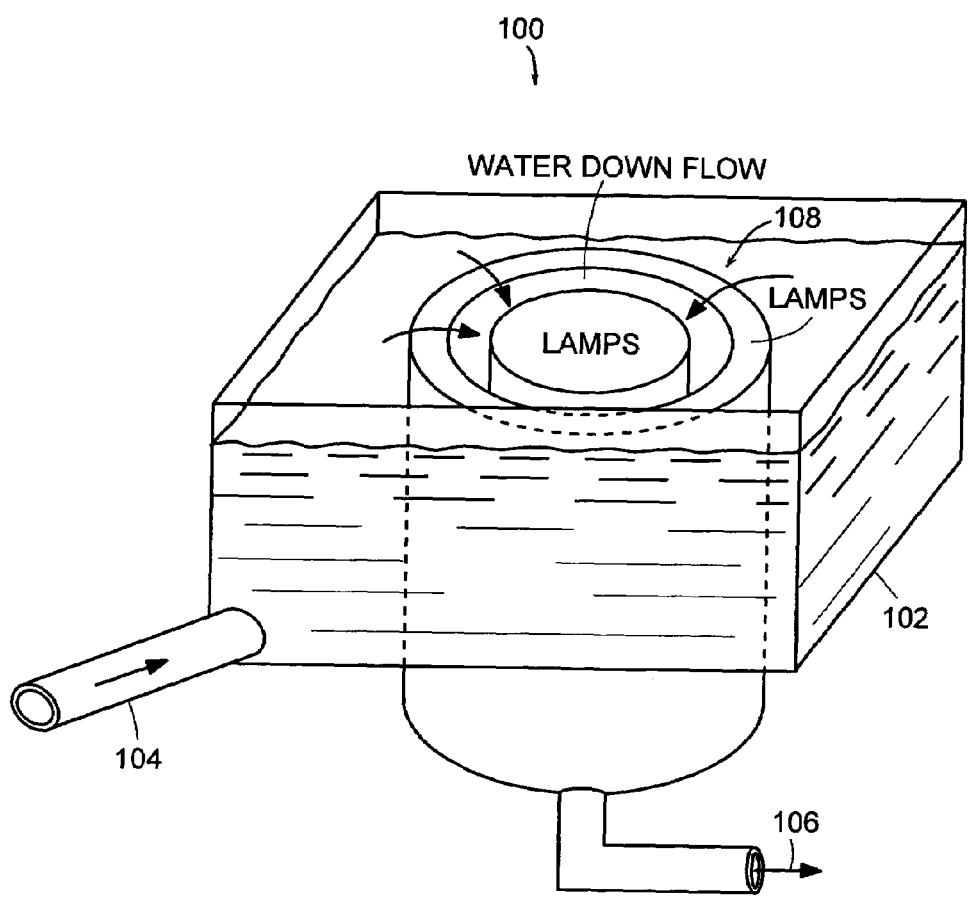
FIGS. 4 and 5 are perspective views of other embodiments.

FIG. 4 shows an embodiment with some similarities to that shown in FIG. 3. As indicated in FIG. 4, a system 100 has a box 102 with an input 104 and an outlet 106. The box has four side walls, each of which can include lamps (e.g., mercury) arranged in linear or serpentine manner (including a U-shape). Another unit 108 can be provided inside box 102 and can also include sterilizing lamps. In this case, the water flows into conduit 104, passes over the top of unit 108, and then down an annular region within unit 108 to outlet 106.

Figure 5:
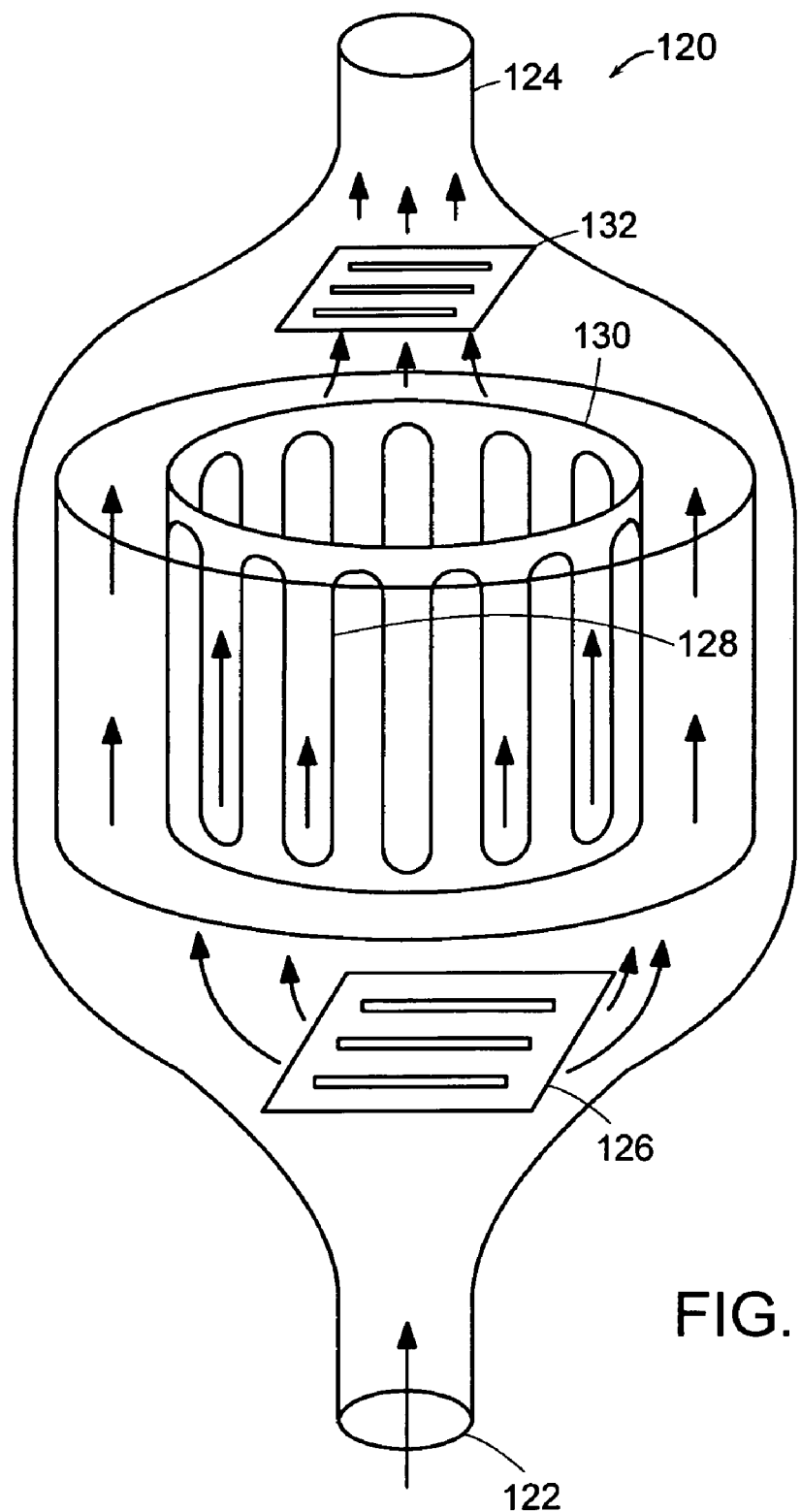

Another embodiment is shown in FIG. 5, which has a unit 120 with an inlet 122 and an outlet 124. The water passes upwardly from inlet 122 and first reaches a lamp plate 126 that can have a series of linear or serpentine or spiral lamps. The water is then directed to an annular region 128 with an outer wall and an interior wall defined by a removable annular lamp unit 130, that can be circular or have any other desired shape, including a square ring. The water is directed to flow between outer wall 128 and unit 130, and thus to pass upwardly past a second lamp plate 132 and then out the outlet 124.

Exemplary operating parameters for a pulsed lamp include the following: a pulse duration of 1–1000 msec, measured at ⅓ peak value for a pulsed light system; energy per pulse of 1 joules–2000 joules; single to continuous pulsing; linear, spiral, or serpentine lamp configuration; 100–1000 nm spectral output; and quartz, suprasil, or sapphire housing window.

Having described several embodiments, it should be apparent that modifications can be made without departing from the scope of the invention as defined by the appended claims. The description refers to water, but other liquids can be treated with this system.

The invention claimed is:

1. A lamp system for treating a liquid with energy from a lamp comprising:
    a housing with an inlet for receiving a liquid to be treated;
    a lamp system including at least a first wall within the housing that has at least one lamp, the first wall having a first side and an opposite second side, the lamp system for providing energy through the first and second sides to the liquid in the housing; and
    at least a second wall within the housing having at least one orifice, the second wall being positioned within the housing to direct the liquid through the orifice;
    the housing, the lamp system, and the second wall configured to provide a flow of liquid between the housing and the first side of the first wall and then past the second side of the first wall;
    the lamp system being removable from the housing.

2. The system of claim 1, wherein the housing includes two parallel walls, and the lamp system first wall is parallel to and between the walls of the housing, the lamp system first wall being shorter than the housing walls to allow the liquid to flow around the lamp system first wall.

3. The system of claim 2, wherein the lamp system first wall is adjustable in position relative to one or both of the housing walls to allow control over a depth of the flow path between the lamp system first wall of the housing walls.

4. The system of claim 1, wherein the lamp is a pulsed lamp.

5. The system of claim 4, wherein the lamp is a UV lamp.

6. A lamp system for treating a liquid with energy from a lamp comprising:
    a housing with an inlet for receiving a liquid to be treated; and
    a lamp system including a walled structure, the walled structure having a cross section transverse to the liquid flow, the cross section having a closed perimeter that defines a region within the perimeter and a region outside the perimeter, the region outside the perimeter and within the housing defining a first annular portion of a flow path, the lamp system further including a central lamp structure within the perimeter, the region inside the perimeter and outside the central lamp structure defining a second annular portion of the flow path;
    the housing and the lamp system configured to provide a flow of liquid through the first and second annular portions, and having one or more lamps for treating the liquid in the region within first and second annular portion.

7. The system of claim 6, wherein the one or more lamps are pulsed UV lamps.

8. The system of claim 7, wherein at least some walls of the housing are UV-reflective to reflect light from the one or more lamps and into the liquid.

9. The system of claim 6, wherein the perimeter is rectangular.

10. The system of claim 6, further comprising a plate with one or more lamps spaced from and oriented perpendicular to the flow path through the region within the perimeter.

11. The system of claim 6, wherein the same one or more lamps treat the liquid in the region within the perimeter and in the region outside the perimeter.

12. The system of claim 1, wherein the second wall does not have a lamp.

13. A lamp system for treating a liquid with energy from a lamp comprising:
   a housing with an inlet for receiving a liquid to be treated and an outlet for releasing a treated liquid;
   a first lamp system including a central core and an annular region outside the central core, the central core having one or more lamps, the first lamp system for providing energy through the central core to the liquid in the housing;
   a second lamp system including a first plate with one or more lamps, the first plate oriented perpendicular to the flow path through the annular region, the second lamp system positioned between the inlet and the first lamp system, the second lamp system for providing energy through the first plate to the liquid in the housing;
   wherein the housing and the lamp systems are configured to provide a flow of liquid past the first plate and through the annular region for treating the liquid in the housing with the one or more lamps of the first plate and the one or more lamps in the central core.

14. The system of claim 13, further comprising:
   a third lamp system including a second plate with one or more lamps, the second plate oriented perpendicular to the flow path through the annular region, the third lamp system positioned between the outlet and the first lamp system, the third lamp system for providing energy through the second plate to the liquid in the housing;
   wherein the housing and the lamp systems are further configured to provide a flow of liquid past the second plate for treating the liquid in the housing with the one or more lamps of the second plate.

15. The system of claim 13, wherein at least some walls of the housing are UV-reflective to reflect light from the one or more lamps and into the liquid.

16. The system of claim 13, wherein the one or more lamps are pulsed lamps.

17. The system of claim 16, wherein the one or more lamps are UV lamps.

* * * * *